(12) United States Patent
Martini et al.

(10) Patent No.: US 9,201,840 B2
(45) Date of Patent: Dec. 1, 2015

(54) GENERATING PROXY AUTOMATIC CONFIGURATION SCRIPTS

(71) Applicant: iboss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/257,912

(22) Filed: Apr. 21, 2014

(65) Prior Publication Data

US 2015/0301982 A1 Oct. 22, 2015

(51) Int. Cl.
*G06F 15/177* (2006.01)
*H04L 29/08* (2006.01)
*G06F 21/62* (2013.01)
*H04L 29/06* (2006.01)

(52) U.S. Cl.
CPC .......... *G06F 15/177* (2013.01); *G06F 21/6218* (2013.01); *H04L 63/0272* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 8,005,983 B2* | 8/2011 | Hopen et al. | 709/238 |
| 8,166,141 B1* | 4/2012 | Van Horne, III | 709/223 |
| 8,613,041 B2* | 12/2013 | Hopen et al. | 726/1 |
| 8,615,796 B2* | 12/2013 | Hopen et al. | 726/13 |
| 2004/0006615 A1* | 1/2004 | Jackson | 709/223 |
| 2006/0143703 A1* | 6/2006 | Hopen et al. | 726/15 |
| 2008/0162698 A1* | 7/2008 | Hopen et al. | 709/226 |
| 2010/0024008 A1* | 1/2010 | Hopen et al. | 726/4 |
| 2010/0036955 A1* | 2/2010 | Hopen et al. | 709/226 |
| 2014/0214921 A1* | 7/2014 | Tiger et al. | 709/203 |

OTHER PUBLICATIONS

Trustwave, Mobile Security Client (MSC) Version 2.1 Administrator Guide:, Dec. 2012, Edition 2.1, All pages.*
Trustwave, "Secure Web Gateway Version 11.0 Hybrid Deployment Guide", 2012, All pages.*
"How to Configure Proxy Settings Using PAC Files and WPAD", Barracuda, Nov. 22, 2013, https://techlib.barracuda.com/display/wsflexv41/how+to+configure+proxy+settings+using+pac+files+and+wpad.*
Google Project Hosting, "Chromium, An Open-Source Project to Help Move the Web Forward", Mar. 24, 2011, Issue 77366, downloaded from the internet at: https://code.google.com/p/chromium/issues/detail?id=77366 on Jul. 26, 2013, 3 pages.

(Continued)

*Primary Examiner* — Ninos Donabed
(74) *Attorney, Agent, or Firm* — Fish & Richardson P.C.

(57) ABSTRACT

Methods and systems for generating a proxy automatic configuration (PAC) script based on the location of a device. One example method includes receiving a request for a proxy automatic configuration (PAC) script from a source address associated with a device; determining, based at least in part on the source address, a location of the device; generating a PAC script based at least in part on the determined location of the device; and sending a response to the request for the PAC script including the generated PAC script.

12 Claims, 4 Drawing Sheets

(56) References Cited

OTHER PUBLICATIONS

Microsoft, "WinHTTP AutoProxy Functions", Jun. 12, 2013, downloaded from the internet at: http://msdn.microsoft.com/en-us/library/windows/desktop/aa384122(v=vs.85).aspx on Jul. 26, 2013, 4 pages.

Wavezgrp, "LoadRunner: Proxy Authentication", Feb. 11, 2011, downloaded from the internet at: www.wavezgrp.wordpress.com/2011/02/11/loadrunner-proxy-authentication/ on Jul. 26, 2013, 5 pages.

* cited by examiner

GENERATING PROXY AUTOMATIC CONFIGURATION SCRIPTS

BACKGROUND

This specification generally relates to generating proxy automatic configuration scripts in response to requests from user devices on a network.

In corporate and other networks, user devices may be configured to access a network in different ways. For example, devices may receive configuration information when they log on to a network from a central location, or may be initialized with such configuration information at regular intervals. The configuration information may control the network access behavior of the particular device.

SUMMARY

In general, one aspect of the subject matter described in this specification may be embodied in systems, and methods performed by data processing apparatuses that include the actions of receiving a request for a proxy automatic configuration (PAC) script from a source address associated with a device; determining, based at least in part on the source address, a location of the device; generating a PAC script based at least in part on the determined location of the device; and sending a response to the request for the PAC script including the generated PAC script.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Proxy automatic configuration or "PAC" scripts are used to control the network access behavior of devices. For example, a PAC script may include instructions to be executed by a device when accessing a network, such as instructions directing the device to use a particular gateway or proxy server when accessing an external network. PAC scripts are generally provided to devices, such as in response to requests, by network management systems, such as, for example, a mobile device management (MDM) system.

Network operators may desire to configure devices to perform different network access behaviors based on the device's location. For example, if a device is connected to an internal network (e.g., "on premise") the device may use a proxy server, while the device may not use a proxy server when connected to an external network (e.g., when "off premise"). One way to implement such behavior is to include appropriate instructions within a PAC script for the device. However, such a solution may be inflexible, as the device will use this same configuration until it receives a new PAC script.

The present disclosure describes, among other things, techniques for generating PAC scripts based on the locations of the devices. In one example, a request is received for a PAC script. The request is received from a source address associated with a device, such as an Internet Protocol (IP) address. From the source address, a location of the device is determined. For example, the device may be determined to be "on premise," "off premise," or some other specific location. A PAC script is then generated based at least in part on the determined location of the device. The generated PAC script is then sent to the device in response to the request.

Implementations according to the present disclosure have several potential advantages. First, a network owner or administrator may be able to manage network access more efficiently than with previous techniques. For example, changes the network access behavior for devices at a specific location may be implemented quickly by changing the PAC script generated for that location. When new devices request a PAC script from that location, they will get the new PAC script and perform the desired behavior. Further, a network owner may be allowed greater control over network access behavior than with previous techniques, as many different PAC scripts can be generated based on different device locations beyond simply "on premise" and "off premise."

Figure 1:
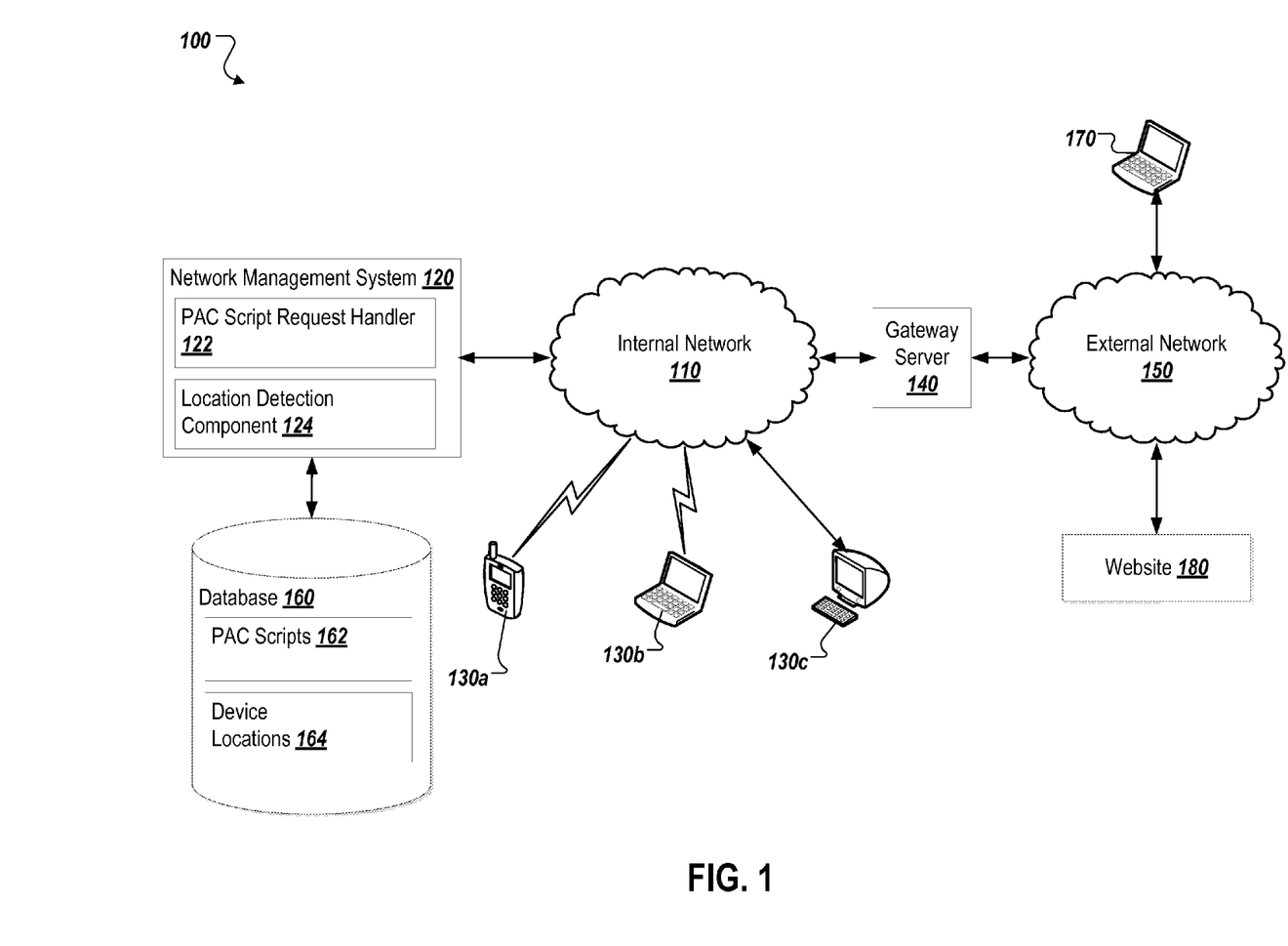
FIG. 1 is a diagram of an example environment.

FIG. 1 is a diagram of an example environment 100 in which various aspects of the subject matter described here may be implemented. The example environment 100 includes an internal network 110 connecting one or more devices 130a-c to a network management system 120. The network management system 120 is connected to a database 160. The gateway server 140 separates the internal network 110 from the external network 150. A device 170 is connected to the external network 150. A plurality of websites 180 are also connected to the external network 150.

In one example implementation, the example environment 100 allows the devices 130a-c and the device 170 to receive different PAC scripts based on their respective locations. In such an implementation, each of the one or more devices 130a-c and the device 170 is configured with a PAC script URL. The PAC script URLs may be configured by the network management system 120, a mobile device management (MDM) system, and/or other systems. In some implementations, each PAC script URL includes the address of the network management system 120. The devices 130a-c and the device 170 may send requests for PAC scripts to the network management system 120 based on the PAC script URLs.

In some implementations, when each of the one or more devices 130a-c connects to the internal network 110, the device may request a PAC script from its configured PAC script URL. The network management system 120 receives the PAC script requests from the source addresses associated with the one or more devices 130a-c. In some cases, the source addresses may be Internet Protocol (IP) addresses, Medium Access Control (MAC) addresses, or other types of addresses. In some implementations, the source address associated with a device indicates the type of network that the device is connected to. In the illustrated example, the devices 130a-c are connected to the internal network 110, the source addresses associated with the devices 130a-c may therefore be local network addresses.

In some implementations, the network management system 120 determines the location of a device based on the source address associated with the device. In the illustrated example, the source addresses associated with the devices 130a-c are local network addresses, because the devices 130a-c are connected to the internal network 110. The network management system 120 may therefore determine that the locations of the devices 130a-c are on-premise, and may generate and respond with an appropriate PAC script for this location.

When the device 170 connects to the external network 150, the device 170 may also request a PAC script from the device's configured PAC script URL. The request may be transmitted to the network management system 120. In the illustrated example, the device 170 is connected to the external network 150. The source address associated with the device 170 may therefore be a public network address. Accordingly, the network management system 120 may determine that the location of the device 170 is off-premise, and may generate and respond with an appropriate PAC script for this location.

The network management system 120 may also determine more specific locations for devices based on the source address associated with the PAC script request, and respond with a PAC script generated specifically for that location. For example, the source address may indicate that the device is in a particular geographic area (e.g., a particular city, country, region, etc.), a particular part of the internal network 110 (e.g., a certain office location), or may indicate certain features of an external network to which the device is connected, such as an owner of the external network. The network management system 120 may generate different PAC scripts based on the different determined locations.

As shown, the example environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In some implementations, the entity that controls the internal network 110 may issue devices to users for use on the internal network 110. The internal network 110 may also be a wired network, such as an Ethernet network.

One or more devices 130a-c are connected to the internal network 110. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the external network 150.

A device 170 is connected to the external network 150. Similar to the one or more devices 130a-c, the device 170 may be a cellular telephone, a smartphone, a tablet, a laptop, a desktop computer, or other computing devices. The device 170 may be a personal device or a device issued by the entity that provides the internal network 110. The device 170 may include network access or web browsing software (e.g., a web browser) for accessing resources on the external network 150.

A network management system 120 is connected to the internal network 110. In some implementations, the network management system 120 may be a computing device or set of devices operable to manage configuration information associated with the one or more devices 130a-c and the device 170. The network management system 120 may include an MDM system for managing configuration information associated with mobile and other devices. In some cases, the network management system 120 may include the gateway server 140 and/or other components.

As shown, the network management system 120 includes a PAC script request handler 122. In some implementations, the PAC script request handler 122 may be operable to receive PAC script requests from the one or more devices 130a-c and the device 170. The PAC script request may be received via the Hypertext Transfer Protocol (HTTP), and may include a URL associated with the requested PAC script.

The network management system 120 also includes a location detection component 124. In some implementations, the location detection component 124 is operable to receive as input the PAC script request from the PAC script request handler 122 and determine the location of the device that sends the request. In some cases, the location detection component 124 may identify the source address associated with the received PAC script request, such as, for example, by examining the request, by calling system calls to determine the source address, by analyzing attributes of a socket on which the request was received, or by other mechanisms. From the source address, the location detection component 124 may determine a location associated with the device that sent the request. For example, the location detection component 124 may determine that the device is on-premise if the source address is a local network address, and determine that the device is off-premise if the source address is a public network address. The location detection component 124 may also, as discussed previously, determine a geographic location associated with the device, a specific network associated with the device, an office location associated with the device, or other types locations. In some implementations, the location detection component 124 sends the determined location to the database 160 to query for the PAC script corresponding to the location of the device, or for PAC script parameters to be used when generating an appropriate PAC scrip for the location.

The example environment 100 also includes a database 160. The database 160 may be one of or a combination of several commercially available database and non-database products. Acceptable products include, but are not limited to Oracle® databases, IBM® Informix® or DB2® databases, MySQL, Microsoft SQL Server®, Ingres®, PostgreSQL, Teradata, Amazon SimpleDB, and Microsoft® Excel, as well as other database and non-database products. Further, database 160 may be operable to process queries specified in any structured or other query language such as, for example, Structured Query Language (SQL). In some implementations, the database 160 may be a file system or storage structure located on separate from or co-located with the network management system 120. The database 160 may also be or set of files within such a file system including configuration information related to the network management system 120.

The database 160 includes PAC scripts 162. In some implementations, the PAC scripts 162 may be collections of instructions to be executed by a device in order to access the external network 150. The following is an example PAC script:

```
function FindProxyForURL(url,host)
{
   if(isResolvable("mydomain.local"))
   {
      return "DIRECT";
   }
   else
   {
      return "PROXY username:password@1.2.3.4";
   }
}
```

This example PAC script will cause the receiving device to access local addresses directly, while using the gateway server "1.2.3.4" for all other requests. In this example, the PAC script is implemented in the JavaScript language. The PAC scripts 162 may include instructions written in other languages including Python, Perl, PHP, and/or other languages.

In response to queries from the network management system 120, the database 160 may provide different PAC scripts based on the location of the device that sends the request. For example, the PAC scripts 162 may include an "on-premise" PAC script and an "off-premise" PAC script. The "on-premise" PAC script includes instructions configured to route network traffic through a gateway server. The "off-premise" PAC script includes instructions configured to route network traffic directly to the external network 150. In some implementations, the network management system 120 determines that the one or more devices 130a-c are on-premise. In response to the queries from network management system 120 for the on-premise devices, the database 160 may provide the "on-premise" PAC script. In some implementations, the "on-premise" PAC script may be generated upon receipt of the request by the network management system 120.

In another example, the network management system 120 may determine that the device 170 is off-premise. In response to the query from the network management system 120 for an off-premise device, the database 160 may provide the "off-premise" PAC script. In some implementations, the "off-premise" PAC script may be generated upon receipt of the request by the network management system 120. In some cases, the network management system 120 may determine a more specific location for the device, such as a geographic location or a particular network location, and select or generate a PAC script based on this location.

The PAC scripts 162 may include templates or parameters used by the network management system 120 to generate a PAC script based on a device location. For example, the PAC scripts 162 may include standard instructions that the network management system 120 may modify based on the determined location of the device.

Database 160 also includes device locations 164. The device locations 164 may include the determined locations for each of the one or more devices 130a-c and the device 170. The database 160 may store a device location after receiving the determined location for a device from the network management system 120. The database 160 may also update the device locations 164 if the determined location for a device from the network management system 120 is different from the stored location of the device.

The gateway server 140 connects the internal network 110 to the external network 150. As shown, the environment 100 also includes a gateway server 140 connected to the internal network 110 and the external network 150. In some implementations, the gateway server 140 is a gateway to a wide-area network (WAN), such as the external network 150, for the one or more devices 130a-c. Requests to access the external network 150 made by the one or more devices 130a-c may be first passed to the gate server 140, which will then pass the request on to the external network 150. In some implementations, the gateway server 140 may perform filtering on these requests, such as blocking access to resources on the external network 150 that are known to include objectionable or otherwise prohibited content. The gateway server 140 may perform this filtering by analyzing requests sent by the one or more devices 130a-c, identifying requests for Uniform Resource Locators (URLs) of known prohibited sites, and returning a response to the sending device indicating that the request will not be fulfilled.

As shown, the gateway server 140 is connected to the external network 150. In some implementations, the external network 150 is the public Internet. The external network 150 may also be any network or combination of networks accessed from the internal network 110 via the gateway server 140. In such an implementation, the external network 150 may be public, private, or a combination of the two. In some implementations, the external network 150 is a distributed network utilizing the Transmission Control Protocol (TCP) in combination with HTTP to transmit requests for pages to web servers connected to the external network 150, and to transmit responses from the web servers to the requesting clients.

In some implementations, after the user-specific credentials are received and verified, the gateway server 140 may associate each request received from the one or more devices 130a-c with the specific user currently using the device in question. This association may occur by examining the device-specific credentials received with the request and determining the currently associated user-specific credentials. In some implementations, the gateway server 140 may apply a user-specific profile to requests from the one or more devices 130a-c based on the associated user-specific credentials. In some instances, the gateway server 140 may use the correlation between user and device to log users off of shared devices after a maximum usage time is reached.

Figure 2:
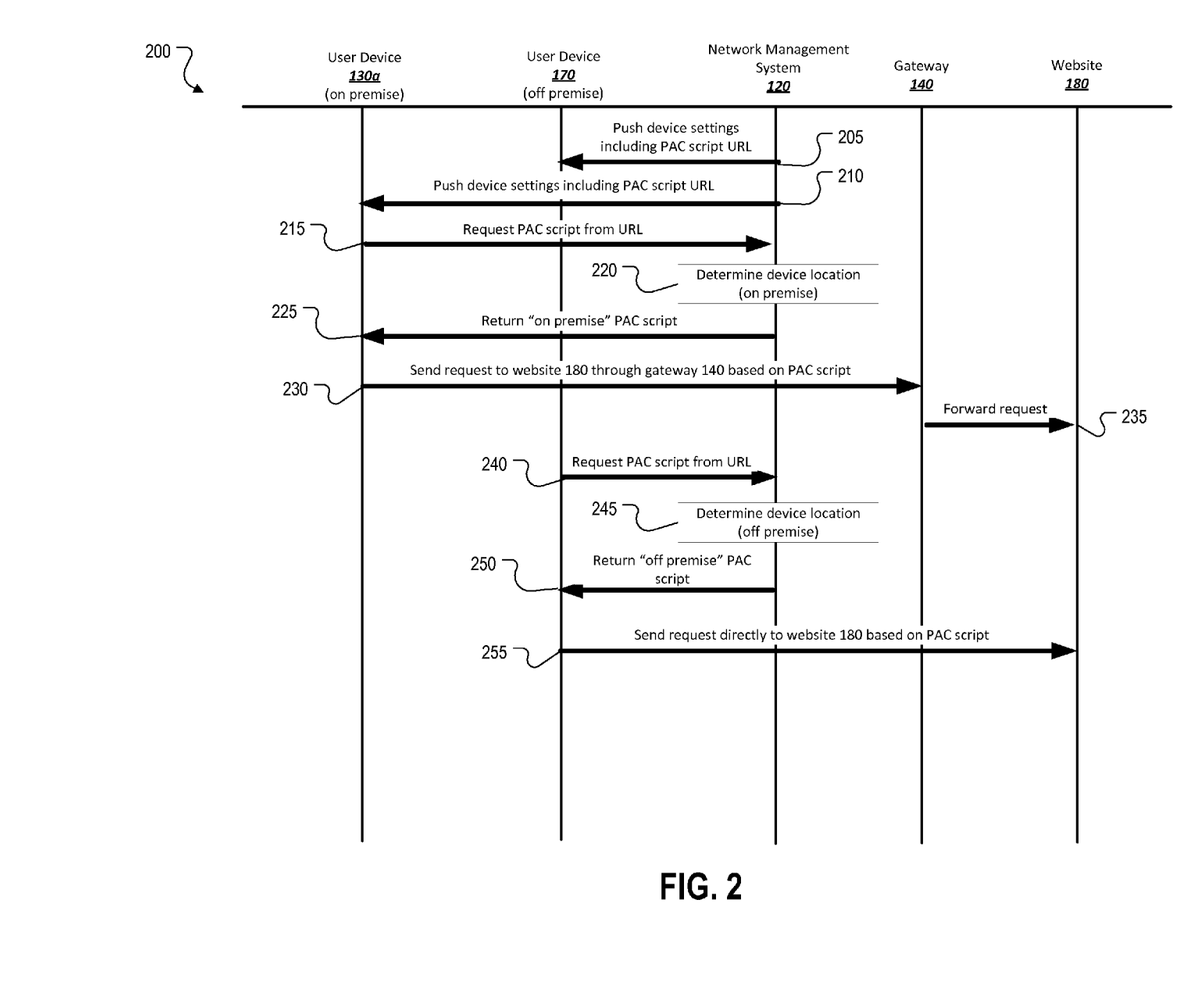
FIG. 2 is a message flow diagram of an example interaction between the components of the example network to generate PAC scripts based on the locations of the user devices.

FIG. 2 is a message flow diagram of an example interaction 200 between the components of the example network 100 to generate PAC scripts based the locations of the devices. In some implementations, the interaction 200 may include additional and/or different components not shown in the message flow diagram. Components may also be omitted from the interaction 200, and additional messages may be added to the interaction 200.

At 205, the network management system 120 pushes proxy settings to the user device 170. The proxy settings may include a PAC script URL specific to the user device 170. In some cases, the network management system 120 may push proxy settings to the user device 170 according to one or more network management protocols, including, but not limited to, DHCP, BOOTP, and/or other protocols.

At 210, the network management system 120 pushes proxy settings to the user device 130a. The proxy settings may include a PAC script URL specific to the user device 130a. In some cases, the network management system 120 may push proxy settings to the user device 130a according to one or more network management protocols, including, but not limited to, DHCP, BOOTP, and/or other protocols.

At 215, the user device 130a requests a PAC script from the PAC script URL received from the network management system 120 at 210. In some cases, the user device 130a requests the PAC script via HTTP, such as by sending an HTTP GET request for the configured PAC script URL. The user device 130a may also request the PAC script via other mechanisms or protocols.

At 220, the network management system 120 determines the location of the user device 130a. In some implementations, the network management system 120 may determine the location of the device 130a based on the source address associated with the user device 130a. In the illustrated example, the user device 130a is connected to the internal network 110, and the source address associated with the user device 130a is a local network address. Accordingly, the network management system 120 may determine that the location of the user device 130a is on-premise.

At 225, the network management system 120 sends a response to the user device 130a that includes a PAC script based on the location of the user device 130a. The PAC script includes instructions to be executed by the user device 130a for accessing the external network 150. In the illustrated example, the network management system 120 determines that the location of the user device 130a is on-premise, and therefore returns an "on-premise" PAC script to the user device 130a. The "on-premise" PAC script may include instructions configured to route network traffic through the gateway server 140. In some implementations, the PAC script may be generated in response to the received request.

At 230, the user device 130a sends a request via HTTP for the website 180 on the external network 150. Based on the "on-premise" PAC script the user device 130a received at 225, the user device 130a sends the request through the gateway server 140. At 235, the gateway 140 forwards the HTTP request to the website 180. The gateway 140 may forward the request after the gateway 140 analyzes and filters the request based on provisioned security functions.

At 240, the user device 170 requests a PAC script from the PAC script URL it received from the network management system 120 at 205. In some cases, the user device 170 requests the PAC script via HTTP, such as by sending an HTTP GET request for the configured PAC script URL.

At 245, the network management system 120 determines the location of the user device 170. In the illustrated example, the user device 170 is connected to the external network 150, and the source address associated with the user device 170 is a public network address. By examining this source address, the network management system 120 may determine that the location of the user device 170 is off-premise.

At 250, the network management system 120 sends a response to the user device 170 that includes a PAC script based on the determined location of the user device 170. In the illustrated example, the network management system 120 determines that the location of the user device 170 is off-premise, and therefore returns an "off-premise" PAC script to the user device 170. The "off-premise" PAC script may include instructions configured to route network traffic directly to the external network 150.

At 255, the device 170 sends a request via HTTP for the website 180 on the external network 150. Based on the "off-premise" PAC script that the user device 170 received at 250, the user device 170 sends the request directly to the website 180.

Figure 3:
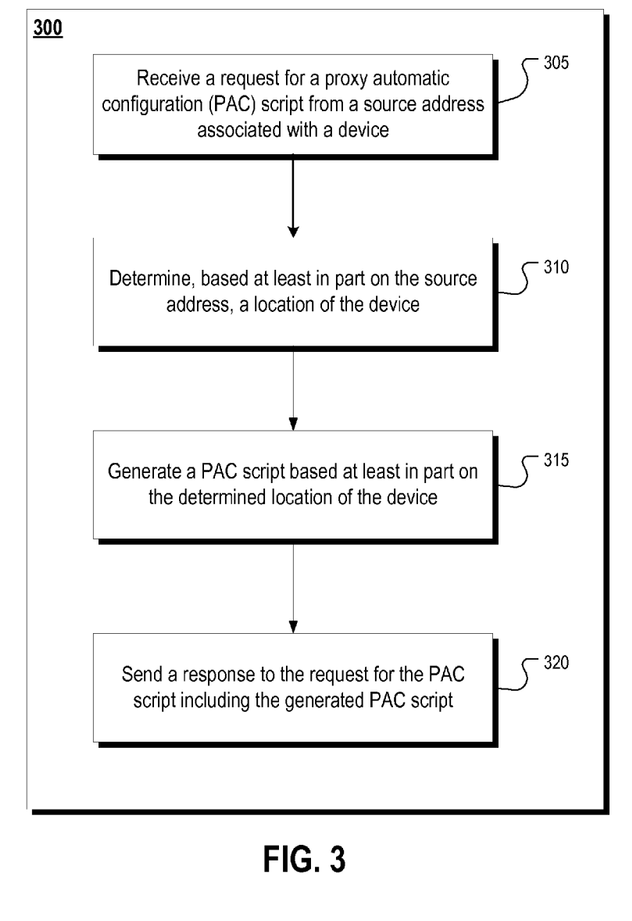
FIG. 3 is a flow chart of an example process of generating PAC scripts based on locations of user devices.

FIG. 3 is a flow chart of an example process 300 of generating PAC scripts based on locations of user devices.

At 305, a request for a PAC script is received from a source address associated with a device. In some implementations, the request for the PAC script includes a HTTP request. In some implementations, the device is a network device such as a cell phone, a laptop, a desktop, and/or other devices. In some implementations, the source address is an IP address.

At 310, the location of the device is determined based at least in part on the source address associated with the device. In some implementations, the location of the device is determined to be on-premise based on the source address being a local network address. In some implementations, the location of the device is determined to be off-premise based on the source address being a public network address.

At 315, a PAC script is generated based at least in part on the determined location of the device. The PAC script may include instructions to be executed by the device when connecting to the external network. The instructions may be coded in a programming language such as JavaScript, Python, Perl, PHP, and/or other programming languages. In some implementations, if the location of the device is determined to be on-premise, a first PAC script is generated. The first PAC script may include instructions configured to route network traffic through a gateway server. If the location of the device is determined to be off-premise, a second PAC script may be generated. The second PAC script may be different than the first PAC script. For example, the second PAC script may include instructions configured to route network traffic directly to the external network.

At 320, a response to the request for the PAC script is sent including the generated PAC script. For example, a response to the request from a source address associated with an on-premise device may include the first PAC script. A response to the request from a source address associated with an off-premise device may include the second PAC script. The first PAC script or the second PAC script may be sent to the device via a network protocol, such as HTTP, File Transfer Protocol (FTP), and/or other network protocols.

Figure 4:
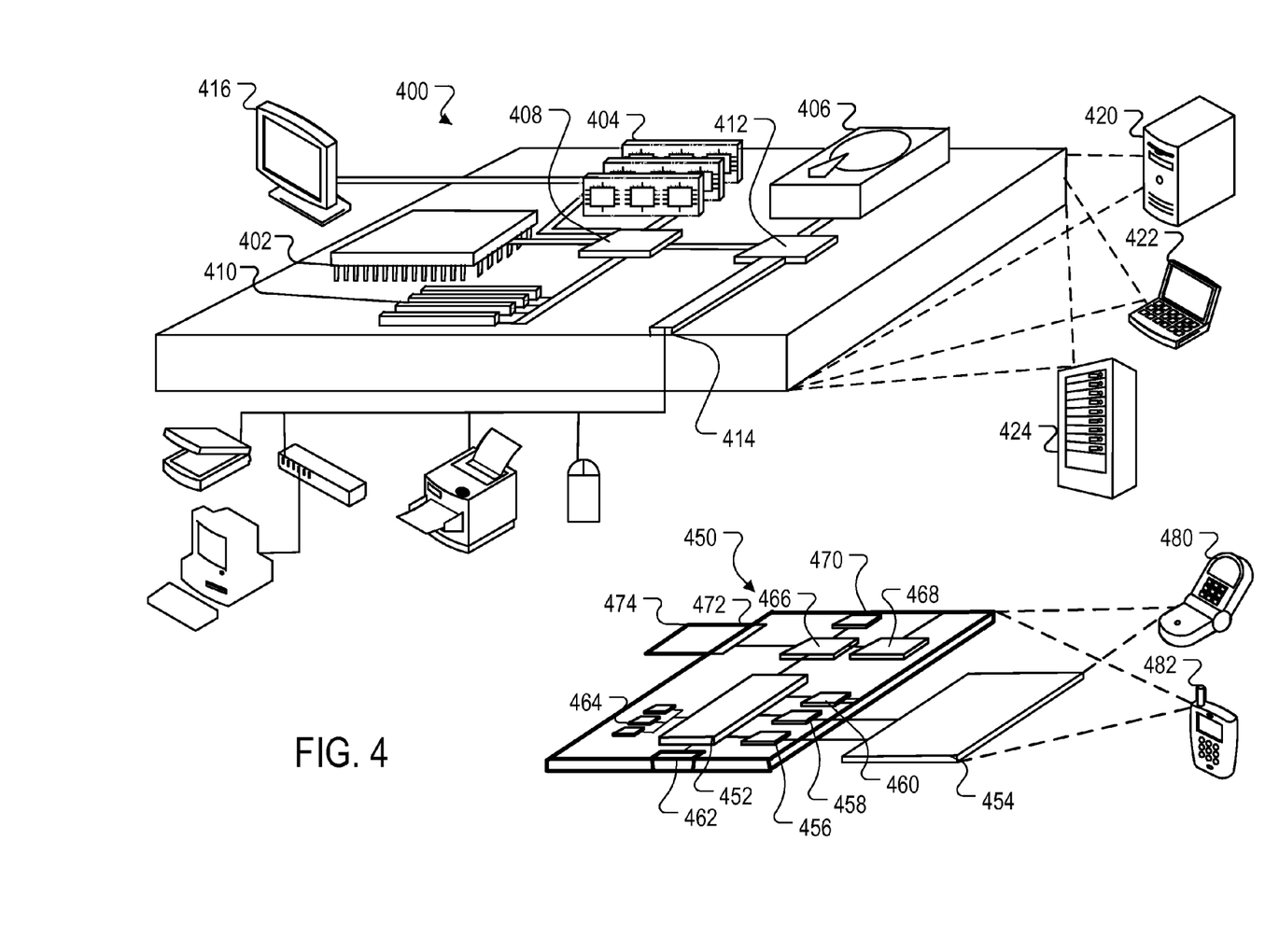
FIG. 4 is a diagram of computing devices that may be used to implement the systems and methods described herein.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
   receiving a request for a proxy automatic configuration (PAC) script from a source address associated with a device;
   in response to receiving the request, determining, based at least in part on the source address, a location of the device including determining whether the device is on-premise or off-premise;
   in response to determining that the location of the device is off-premise, generating a PAC script based at least in part on the determined location of the device, wherein the generated PAC script is associated with the determined location of the device and includes instructions configured to route network traffic directly to network resources;
   sending a response to the request for the PAC script including the generated PAC script;
   receiving a second request for a second proxy automatic configuration (PAC) script from a second source address associated with the device;
   in response to receiving the second request, determining, based at least in part on the second source address, a second location of the device including determining whether the device is on-premise or off-premise; and
   in response to determining that the second location of the device is on-premise, generating a second PAC script based at least in part on the determined second location of the device, wherein the generated second PAC script is different than the PAC script.

2. The method of claim 1, wherein the second PAC script includes instructions configured to route network traffic through a gateway server.

3. The method of claim 1, wherein determining the second location of the device includes determining that the device is on-premise based on the source address being a local network address.

4. The method of claim 1, wherein determining the location of the device includes determining that the device is off-premise based on the source address being a public network address.

5. The method of claim 1, wherein receiving the request for the PAC script includes receiving a Hypertext Transfer Protocol (HTTP) request, and the source address is an Internet Protocol (IP) address.

6. A system comprising:
   a processor configured to execute computer program instructions; and
   a tangible, non-transitory computer storage medium encoded with computer program instructions that, when executed by the processor, cause the system to perform operations comprising:
   receiving a request for a proxy automatic configuration (PAC) script from a source address associated with a device;

in response to receiving the request, determining, based at least in part on the source address, a location of the device including determining whether the device is on-premise or off-premise;

in response to determining that the location of the device is off-premise, generating a PAC script based at least in part on the determined location of the device, wherein the generated PAC script is associated with the determined location of the device and includes instructions configured to route network traffic directly to network resources;

sending a response to the request for the PAC script including the generated PAC script;

receiving a second request for a second proxy automatic configuration (PAC) script from a second source address associated with the device;

in response to receiving the second request, determining, based at least in part on the second source address, a second location of the device including determining whether the device is on-premise or off-premise; and in response to determining that the second location of the device is on-premise, generating a second PAC script based at least in part on the determined second location of the device, wherein the generated second PAC script is different than the PAC script.

7. The system of claim 6, wherein the second PAC script includes instructions configured to route network traffic through a gateway server.

8. The system of claim 6, wherein determining the second location of the device includes determining that the device is on-premise based on the source address being a local network address.

9. The system of claim 6, wherein determining the location of the device includes determining that the device is off-premise based on the source address being a public network address.

10. The system of claim 6, wherein receiving the request for the PAC script includes receiving a Hypertext Transfer Protocol (HTTP) request, and the source address is an Internet Protocol (IP) address.

11. A non-transitory, computer-readable medium storing instructions operable when executed to cause at least one processor to perform operations comprising:

receiving a request for a proxy automatic configuration (PAC) script from a source address associated with a device;

in response to receiving the request, determining, based at least in part on the source address, a location of the device including determining whether the device is on-premise or off-premise;

in response to determining that the location of the device is off-premise, generating a PAC script based at least in part on the determined location of the device, wherein the generated PAC script is associated with the determined location of the device and includes instructions configured to route network traffic directly to network resources;

sending a response to the request for the PAC script including the generated PAC script;

receiving a second request for a second proxy automatic configuration (PAC) script from a second source address associated with the device;

in response to receiving the second request, determining, based at least in part on the second source address, a second location of the device including determining whether the device is on-premise or off-premise; and in response to determining that the second location of the device is off-premise, generating a second PAC script based at least in part on the determined second location of the device, wherein the generated second PAC script is different than the PAC script.

12. The computer-readable medium of claim 11, wherein the second PAC script includes instructions configured to route network traffic through a gateway server.

* * * * *